United States Patent
Wang et al.

(10) Patent No.: US 8,022,361 B2
(45) Date of Patent: Sep. 20, 2011

(54) MONOLITHIC MULTINOZZLE EMITTERS FOR NANOELECTROSPRAY MASS SPECTROMETRY

(75) Inventors: Daojing Wang, Daly City, CA (US); Peidong Yang, Kensington, CA (US); Woong Kim, Seoul (KR); Rong Fan, Pasadena, CA (US)

(73) Assignee: The Regents of the University of California, Oakland, CA (US)

( * ) Notice: Subject to any disclaimer, the term of this patent is extended or adjusted under 35 U.S.C. 154(b) by 23 days.

(21) Appl. No.: 12/298,905

(22) Filed: Oct. 28, 2008

(65) Prior Publication Data
US 2010/0075428 A1 Mar. 25, 2010

Related U.S. Application Data

(63) Continuation of application No. PCT/US2007/066678, filed on Apr. 15, 2007.

(60) Provisional application No. 60/746,012, filed on Apr. 28, 2006.

(51) Int. Cl.
*H01J 49/04* (2006.01)
*B05B 1/14* (2006.01)

(52) U.S. Cl. ......................... 250/288; 239/548
(58) Field of Classification Search .................. 250/288; 239/548
See application file for complete search history.

(56) References Cited

U.S. PATENT DOCUMENTS
6,596,988 B2 * 7/2003 Corso et al. .................. 250/288

OTHER PUBLICATIONS

Abersold et al., "Mass Spectrometry-based proteomics", Nature, 2003, vol. 13, p. 198.
Patterson et al., "Proteomics: the first decade and beyond", Nat Genet, 2003, vol. 33, p. 311.
Takats et al.; "Mass spectrometry sampling under ambient conditions with desorption electrospray ionization", 2004, vol. 306, p. 471.
Tanaka et al., "Protein and polymer analyses up to m/z 100 000 by laser ionization time-of-flight mass spectrometry", Rapid Comm Mass Spectrom, 1988, vol. 2, p. 151.
Karas et al., "Laser desorption ionization of proteins with molecular masses exceeding 10,000 daltons", Anal Chem, 1988, vol. 60, p. 2299.
Wei et al., "Desorption-ionization mass spectrometry on porous silicon", Nature, 1999, vol. 399, p. 243.
Go et al., "Desorption/ionization on silicon nanowires", Anal Chem, 2005, vol. 77, p. 1641.
Finkel et al., "Ordered silicon nanocavity arrays in surface-assisted desorption/ionization mass spectrometry", Anal Chem, 2005, vol. 77, p. 1088.

(Continued)

*Primary Examiner* — Jack I Berman
(74) *Attorney, Agent, or Firm* — Robin C. Chiang; Lawrence Berkeley National Laboratory

(57) ABSTRACT

Novel and significantly simplified procedures for fabrication of fully integrated nanoelectrospray emitters have been described. For nanofabricated monolithic multinozzle emitters ($NM^2$ emitters), a bottom up approach using silicon nanowires on a silicon sliver is used. For microfabricated monolithic multinozzle emitters ($M^3$ emitters), a top down approach using MEMS techniques on silicon wafers is used. The emitters have performance comparable to that of commercially-available silica capillary emitters for nanoelectrospray mass spectrometry.

19 Claims, 14 Drawing Sheets

OTHER PUBLICATIONS

Xu et al., "Carbon nanotubes as assisted matrix for laser desorption/ionization time-of-flight mass spectrometry", Anal Chem, 2003, vol. 75, p. 6191.
Pan et al., "Using oxidized carbon nanotubes as matrix for analysis of small molecules by MALDI-TOF MS", J Am Soc Mass Spectrom, 2005, vol. 16, p. 883.
Chaurand et al., "Imaging mass spectrometry: principles and potentials", Toxicol Pathol, 2005, vol. 33, p. 92.
Fenn et al., "Electrospray ionization for mass spectrometry of large biomolecules", Science, 1989, vol. 246, p. 64.
Wilm et al., "Analytical properties of the nanoelectrospray ion source", Anal Chem, 1996, vol. 68, p. 1.
Juraschek et al., "Nanoelectrospray—more than just a minimized-flow electrospray ionization source", J Am Soc Mass Spectrom, 1999, vol. 10, p. 300.
Schmidt et al., "Effect of different solution flow rates on analyte ion signals in nano-ESI MS, or: when does ESI turn into nano-ESI?", J Am Soc Mass Spectrom, 2003, vol. 14, p. 492.
Schultz et al., "A fUlly integrated monolithic microchip electrospray device for mass spectrometry", Anal Chem, 2000, vol. 72, p. 4058.
Zhang, S. and Van Pelt, C.K, Chip-based nanoelectrospray mass spectrometry for protein characterization. Expert Rev Proteomics, 2004. 1(4): p. 449-68 [Abstract only].
Licklider et al., "A micromachined chip-based electrospray source for mass spectrometry", Anal Chem, 2000, vol. 72, p. 367.
Yang et al., "Quantitative mass spectrometric determination of methylphenidate concentration in urine using an electrospray ionization source integrated with a polymer microchip", Anal Chem, 2004, vol. 76, p. 2568.
Aderogba et al., "Nanoelectrospray ion generation for high-throughput mass spectrometry using a micromachined ultrasonic ejector array", Appl Phys Lett, 2005, vol. 86, p. 203110.
Alivisatos et al., "Semiconductor Clusters, Nanocrystals, and Quantum Dots", Science, 1996, vol. 271, p. 933.
Michalet et al., "Quantum dots for live cells, in vivo imaging, and diagnostics", Science, 2005, vol. 307, p. 538.
Woodside et al., "Scanned probe imaging of single-electron charge states in nanotube quantum dots", Science, 2002, vol. 296, p. 1098.
Postma et al., "Carbon nanotube single-electron transistors at room temperature", Science, 2001, vol. 293, p. 76.
Rao et al., "Giant Magnetoresistance in Transition Metal Oxides", Science, 1996, vol.
Harman et al., "Quantum dot superlattice thermoelectric materials and devices", Science, 2002, vol. 297, p. 2229.
Yang et al., "The Chemistry and Physics of Semiconductor Nanowires", MRS Bulletin, 2005, vol. 30, p. 85.
Wu et al., "Block-by-Block Growth of Single-Crystalline Si/SiGe Superlattice Nanowires", Nano Lett, 2002, vol. 2, p. 83.
Law et al., "Photochemical Sensing of NO2 with SnO2 Nanoribbon Nanosensors at Room Temperature", Angew Chem Int Ed, 2002, vol. 41, p. 2405.
Cui et al., "Nanowire nanosensors for highly sensitive and selective detection of biological and chemical species", Science, 2001, vol. 293, p. 1289.
Huang et al., "Room-temperature ultraviolet nanowire nanolasers", Science, 2001, vol. 292, p. 1897.
Goldberger et al., "Single-crystal gallium nitride nanotubes", Nature, 2003, vol. 422, p. 599.
Law et al., "Nanoribbon waveguides for subwavelength photonics integration", Science 2004, vol. 305, p. 1269.
Law et al., "Semiconductor Nanowires and Nanotubes", Annu Rev Mater Sci, 2004, vol. 34, p. 83.
Karnik et al., "Electrostatic control of ions and molecules in nanofluidic transistors", Nano Lett, 2005, vol. 5, p. 943.
Fan et al., "Polarity switching and transient responses in single nanotube nanofluidic transistors", Physic Rev Lett, 2005, vol. 95, p. 086607.
Fan et al., "DNA Translocation in Inorganic Nanotubes", Nano Lett, 2005, vol. 5, p. 1633.
Fan et al., "Fabrication of silica nanotube arrays from vertical silicon nanowire templates", J Am Chern Soc, 2003, vol. 125, p. 5254.
Smith et al., "Ultrasensitive and quantitative analyses from combined separations-mass spectrometry for the characterization of proteomes", Acc Chem Res, 2004, vol. 37, p. 269.
Dole et al., "Molecular Beams of Macroions", J Chem Phys, 1968, vol. 49, p. 2240.
Iribarne et al., "On the evaporation of small ions from charged droplets", J Chem Phys, 1976, vol. 64, p. 2287.
Gomez et al., "Charge and fission of droplets in electrostatic sprays", Phys Fluids, 1994, vol. 6, p. 404.
Wilm et al., "Electrospray and Taylor-Cone theory, Dole's beam of macromolecules at last?", Int J Mass Spectrom Ion Processes, 1994, vol. 136, p. 167.
Fernandez de la Mora et al., "The Current Emitted by Highly Conducting Taylor Cones", J Fluid Mech, 1994, vol. 260, p. 155.
Pfeiffer et al., "Parametric Studies of Electrohydrodynamic Spraying", AIAA J, 1968, vol. 6, p. 496.
Whittal et al., "Nanoliter chemistry combined with mass spectrometry for peptide mapping of proteins from single mammalian cell lysates", Anal Chem, 1998, vol. 70, p. 5344.
Li et al., "Single-cell Maldi: a new tool for direct peptide profiling", Trends Biotechnol, 2000, vol. 18, p. 151.
Zhang et al., "One-dimensional protein analysis of an HT29 human colon adenocarcinoma cell", Anal Chern, 2000, vol. 72, p. 318.
Hu et al., "Cell cycle-dependent protein fingerprint from a single cancer cell: image cytometry coupled with single-cell capillary sieving electrophoresis", Anal Chem, 2003, vol. 75, p. 3495.
Irish et al., "Single cell profiling of potentiated phospho-protein networks in cancer cells", Cell, 2004, vol. 118, p. 217.
Wang et al., "Proteomic profiling of bone marrow mesenchymal stem cells upon transforming growth factor β1 stimulation", J Biol Chern, 2004, vol. 279, p. 43725.
Kim et al., "Microfabricated PDMS Multichannel Emitter for Electrospray Ionization Mass Spectrometry", J Am Soc Mass Spectrom, 2001, vol. 12, p. 463.
Schilling et al., "A new on-chip ESI nozzle for coupling of MS with microfluidic devices", Lab Chip, 2004, vol. 4, p. 220.
Le Gac et al., "A planar microfabricated nanoelectrospray emitter tip based on a capillary slot", Electrophoresis, 2003, vol. 24, p. 3640.
Nordstrom et al., "Rendering SU-8 hydrophilic to facilitate use in micro channel fabrication", J Micromech Microeng, 2004, vol. 14, p. 1614.
Desai et al., "A MEMS Electrospray Nozzle for Mass Spectroscopy", Transducers '97, 1997 International Conference on Solid-state Sensors and Actuators, Chicago, Jun. 16-19, 1997, vol. 2, p. 927.
Griss et al., "Development of micromachined hollow tips for protein analysis based on nanoelectrospray ionization mass spectrometry", J Micromech Microeng, 2002, vol. 12, p. 682.
Arscott et al, "Electrospraying from nanofluidic capillary slot", Appl Phys Lett, 2005, vol. 87, p. 134101.
Deng et al., "Increase of electrospray throughput using multiplexed microfabricated sources for the scalable generation of monodisperse droplets", J Aerosol Sci, 2006, vol. 37, p. 696.
International Search Report for Application No. PCT/US07/66678, "Monolithic Multinozzle Emitters for Nanoelectrospray Mass Spectrometry", 2007.

* cited by examiner

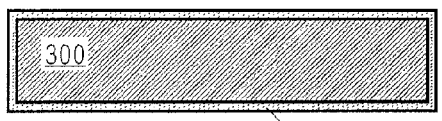
FIG. 3a
FIG. 3b
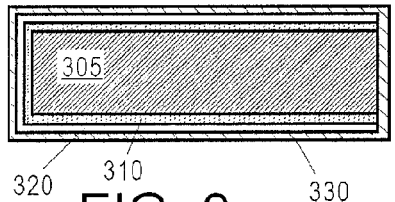
FIG. 3c
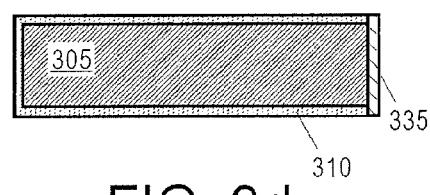
FIG. 3d
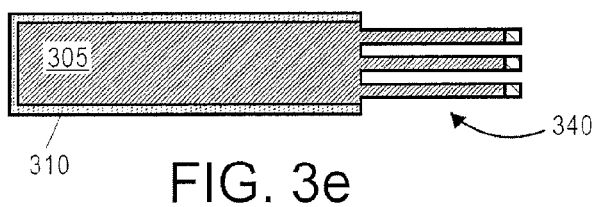
FIG. 3e
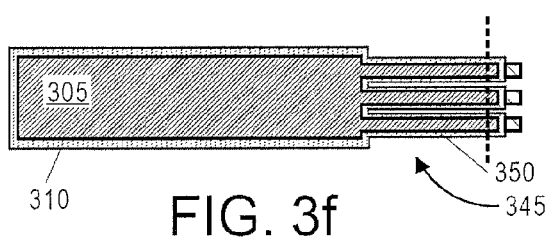
FIG. 3f
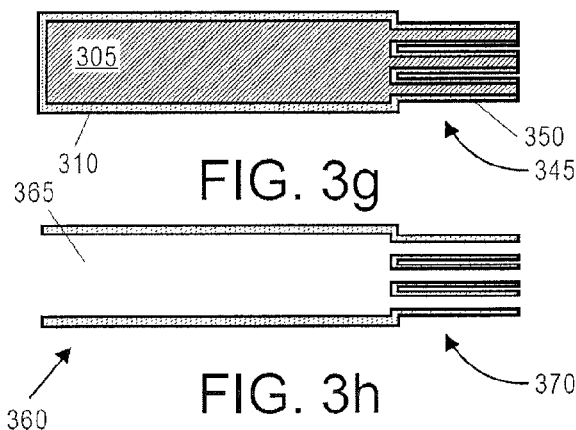
FIG. 3g
FIG. 3h FIG. 8a
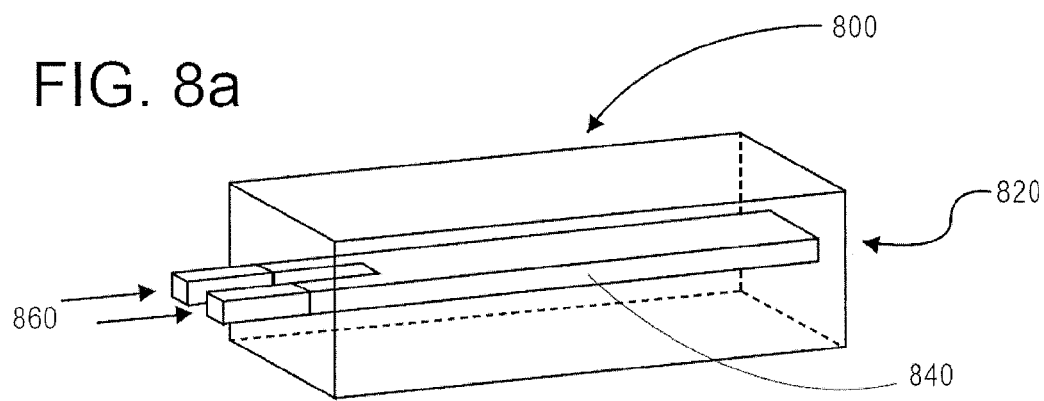
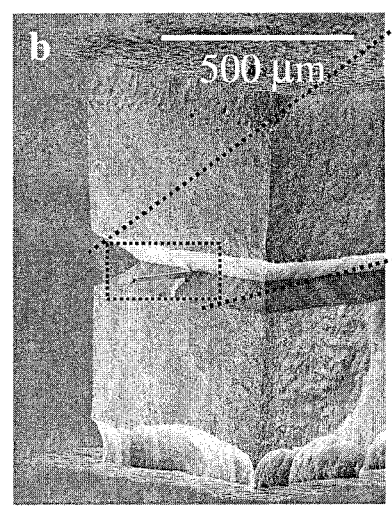
FIG. 8b
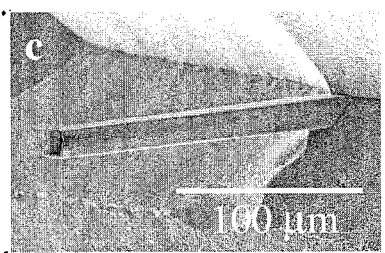
FIG. 8c
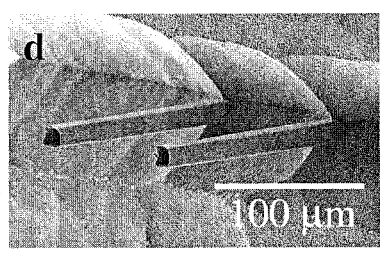
FIG. 8d

MONOLITHIC MULTINOZZLE EMITTERS FOR NANOELECTROSPRAY MASS SPECTROMETRY

CROSS-REFERENCE TO RELATED APPLICATIONS

This application is a continuation application of PCT Application No. PCT/US2007/066678 filed on Apr. 15, 2007 which claimed priority to U.S. Provisional Patent Application 60/746,012, filed Apr. 28, 2006, both of which are hereby incorporated by reference in their entirety.

STATEMENT OF GOVERNMENTAL SUPPORT

The invention described and claimed herein was made in part utilizing funds supplied by the U.S. Department of Energy under Contract No. DE-AC02-05CH11231 and in part utilizing funds supplied by National Institutes of Health Grant R21GM077870. The U.S. Government has certain rights in this invention.

TECHNICAL FIELD

This invention relates generally to electrospray ionization emitters for mass spectrometry, and, more specifically, to methods for forming such emitters for nanoelectrospray mass spectrometry for proteomic and metabolomic applications.

BACKGROUND ART

Mass spectrometry measures the mass-to-charge ratio (m/z) of ions formed from analyte molecules. As shown in FIG. 1, mass spectrometers have three principal components: an ion source, a mass analyzer and an ion detector. The function of the ionization source is to convert analyte molecules into gas phase ions. Electrospray ionization (ESI) is a technique used in mass spectrometry to produce ions. It is especially useful in producing ions from macromolecules because it overcomes the propensity of these molecules to fragment when ionized. The ions are accelerated under vacuum in an electric filed and separated by mass analyzers according to their m/z ratios. Exemplary mass analyzers include triple-quadrupole, time-of-flight (TOF), ion trap, quadrupole-TOF, and Fourier transform ion cyclotron resonance (FTICR) analyzers. As individual ions reach the detector, they are counted. During the last several years, technological developments in mass spectrometers have greatly improved the mass accuracy, resolution and sensitivity. However, there still remain great opportunities and challenges in mass spectrometry.

Proteomics and metabolomics as are generating new knowledge-bases for hypothesis-driven biochemical and bio-imaging studies. Mass spectrometry has been the enabling technology for much of this research. Yet, the sensitivity and dynamic range have not been sufficient for all analyses. Thus far, Fourier transform ion cyclotron resonance mass spectrometry has achieved some of the best results—a detection limit of 10 zmole (i.e., 6000 molecules) for tryptic peptides of bovine albumin and a dynamic range of at least 6 orders of magnitude. This sensitivity suffices for the detection of the most abundant proteins in a single mammalian cell. However, due to the huge dynamic range ($10^6$-$10^9$) of proteins in the cell, it still remains a challenge to detect many of the less abundant proteins, even those that are present in large amounts. Revolutionary innovations can help to achieve proteomics and metabolomics of single cells. Mass spectrometry analysis that uses a very small sample size and has excellent ionization efficiency and extremely high resolution, accuracy, and dynamic range would be useful for performing such analyses.

One dominant soft-ionization method that can ionize large biomolecules such as peptides and proteins without significant fragmentation is electrospray ionization (ESI). In ESI, a volatile liquid containing an analyte moves through a very thin, charged capillary. The liquid is dispersed into a mist of small charged droplets by applying a high electric potential between the capillary and a counter electrode. As the liquid evaporates, highly charged analyte molecules explode out from the droplets. The smaller the droplets, the larger the explosion. In general, for conventional electrospray, the smallest capillaries have an inner diameter of approximately 1 µm and generate droplet diameters in the range of 1-2 µm with a flow rate of 20-40 nanoliters per minute (nL/min).

At sufficiently low flow rate and concentration, there is on average less than one analyte molecule per droplet. Ionization efficiencies can approach 100% as the analyte is dispersed in very small, easily desolvated, charged droplets. This limit is reached only if the concentration is low enough. The abundance of sample ions created by ESI can reach a plateau at certain concentrations and does not increase beyond the plateau even with increased sample concentration. Thus there is a limited dynamic range, which can be a serious drawback. In a complex mixture this problem can be especially severe. This ion suppression effect, which seems to occur at flow rates in the range of 50 nL/min and higher and is effectively absent at flow rates below approximately 20 nL/min, can render less abundant ions undetectable. Further reduction in the droplet size can alleviate this problem, increasing both the dynamic range and sensitivity of mass spectrometry.

In order to achieve lower flow rates, in the range of picoliters per minute (pL/min) or less, much smaller capillaries with sub-micron inner-diameters are needed. But there are difficulties associated with fabrication of such small capillaries, and there can be problems with increased back pressures from such extremely small channels. In addition, very small capillaries can lead to low throughput because of the need for careful and tedious alignment in the mass spectrometer.

There have been efforts to fabricate ESI emitters using polymeric materials, such as parylene (Licklider, L.; Wang, X. Q.; Desai, A.; Tai, Y. C.; Lee, T. D. *Anal. Chem.* 2000, 72, 367-375; Yang, Y. N.; Kameoka, J.; Wachs, T.; Henion, J. D.; Craighead, H. G. *Anal. Chem.* 2004, 76, 2568-2574), poly(dimethylsiloxane) (PDMS) (Kim, J. S.; Knapp, D. R. *J. Am. Soc. Mass Spectrom.* 2001, 12, 463-469), poly(methyl methacrylate) (PMMA) (Schilling, M.; Nigge, W.; Rudzinski, A.; Neyer, A.; Hergenroder, R. *Lab Chip* 2004, 4, 220-224), and negative photoresist SU-8 (Le Gac, S.; Arscott, S.; Rolando, C. *Electrophoresis* 2003, 24, 3640-3647; Nordstrom, M.; Marie, R.; Calleja, M.; Boisen, A. *J. Micromech. Microeng.* 2004, 14, 1614-1617). However, inherent properties of these hydrophobic polymers, such as strong binding affinity to proteins and incompatibility with organic solvents, have limited their usefulness for electrospray applications.

There have also been efforts to fabricate ESI emitters using silicon-based materials, such as silicon nitride (Desai, A.; Tai, Y.; Davis, M. T.; Lee, T. D. International Conference on Solid State Sensors and Actuators (Transducers '97), Piscataway, N.J., 1997, 927-930) and silicon/silica (Schultz, G. A.; Corso, T. N.; Prosser, S. J.; Zhang, S. *Anal. Chem.* 2000, 72, 4058-4063; Griss, P.; Melin, J.; Sjodahl, J.; Roeraade, J.; Stemme, G. *J. Micromech. Microeng.* 2002, 12, 682-687). In-plane silicon nitride emitter fabrication has failed due to intrinsic clogging problems arising from the etching of phosphosilicate glass between silicon nitride layers. Out-of-plane fabrication of silicon/silica has been limited critically because of the additional assembly steps needed to attach emitters to the end of a microfluidic channel. More recent efforts to make nanoelectrospray emitters from nanofluidic capillary slot and micromachined ultrasonic ejector arrays have faced similar challenges (Arscott, S.; Troadec, D. *Appl. Phys. Lett.* 2005, 87, 134101). None of these emitters has achieved desired flow rates of pL/min or less. In addition, no monolithic multi-nozzle emitter for nanoelectrospray mass spectrometry has ever been fabricated.

To increase the sensitivity of ESI further and to interface the emitters with lab-on-a-chip, breakthroughs in the design and fabrication of ultra-narrow emitters are clearly needed.

DISCLOSURE OF INVENTION AND BEST MODE FOR CARRYING OUT THE INVENTION

The embodiments of the invention are illustrated in the context of nanoelectrospray emitters for mass spectrometry. The skilled artisan will readily appreciate, however, that the materials and methods disclosed herein will have application in a number of other contexts where very small droplet size and very slow fluid flow rates are desirable.

The terms "nozzle," "capillary," and "tubule" are used interchangeably in this disclosure to mean a very thin tube out of which an analyte solution can flow and form small droplets. The term "emitter" is used to mean the assembly that includes both the nozzle(s) and a base chamber or tube that supplies an analyte solution to the nozzle(s). In the case of a single nozzle, the terms "emitter" and "nozzle" can refer to the same structure as there is a one-to-one correspondence between the nozzle and its base chamber; the base chamber can be thought of as a simple extension of the nozzle. The term "trench" is used to mean a groove or ditch in a surface. The term "channel" is used to mean a trench that has been enclosed to form a hollow elongated structure, such as a cylinder. A channel can have a circular, square, rectangular, triangular, or any polygonal or closed curve cross section. The term "monolithic" is used to mean consisting of one piece, solid and unbroken. In a monolithic structure there are no joints or seams. The terms nanospray and nanoelectrospray are used interchangeably to mean electrospray at nanoliter/min flow rates. The term "femtoelectrospray" is used to describe electrospray at femtoliter/min flow rate.

Electrospray ionization (ESI) is a technique used in mass spectrometry to produce ions using a nozzle, capillary, or tubule. ESI is especially useful in producing ions from macromolecules because it overcomes the propensity of these molecules to fragment when ionized. One important variation on the basic electrospray technique, which generally offers better sensitivity, is nanospray ionization, in which the flow rate of the analyte solution is microliters/minute ($\mu$L/min) or nanoliters/minute (nL/min).

Silica ($SiO_2$) nanotubes can be especially useful as ESI emitters because of their ease of formation and possibilities for surface functionalization. In addition, their hydrophilic properties make silica electrospray emitters intrinsically more compatible with a wide variety of biomolecules than electrospray emitters made from hydrophobic polymers. Studies in nanofluidics have shown that biomolecules can indeed be transported through hydrophilic silica nanotubes.

In one embodiment of the invention, an electrospray emitter has one silica nozzle extending out from a larger silica base tube. The walls of the nozzle and the base tube form a monolithic whole. They are connected seamlessly and provide a sealed, continuous fluid path for analytes from the base tube to the nozzle. In one arrangement, the emitters protrude at least 10 $\mu$m from the base tube, i.e., the open ends of the nozzles are at least 10 $\mu$m away from the base tube. In another arrangement, the emitters protrude about 150-200 $\mu$m from the base tube. In another arrangement, the emitters protrude about 100-150 $\mu$m from the base tube. In another arrangement, the emitters protrude about 50-100 $\mu$m from the base tube. In yet another arrangement, the emitters protrude about 10-50 $\mu$m from the base tube.

In another embodiment of the invention, there are several silica nozzles extending out from a larger silica base tube. The nozzles and base tube form a monolithic whole. In one arrangement, the nozzles each have an interior or channel cross sectional area of no more than 120 square $\mu$m. In another arrangement, the nozzles each have an interior cross sectional area of no more than 100 square $\mu$m. In one arrangement, the silica nozzles have a linear density of at least 100 per millimeter. In another arrangement, the nozzles have a linear density of at least 10 per millimeter. In another arrangement, the nozzles have an areal density of between about $10^4$ and $10^6$ nozzles per square millimeter.

In one embodiment, an electrospray emitter has a base tube and a plurality of smaller tubules connected seamlessly to the one end of the base tube. The structure is monolithic and defines sealed (i.e., non-leaking), continuous fluid paths from the base tube through the tubules.

Embodiments of the invention include methods of making ESI emitters with very small inner nozzle cross sectional areas. The methods are variations on a general idea that involves making a silicon template, encasing the template in silica, and then removing the silicon, leaving a monolithic silica emitter structure. Two approaches to fabrication of ESI emitters can be thought of as follows: 1) a "bottom up" approach, wherein the template is made by the building up of very small starting structures; and 2) a "top down" approach, wherein the template is made by removing material from much larger starting structures.

Bottom Up Fabrication

In one embodiment of the invention, nanofabricated monolithic multinozzle ($NM^2$) emitters are formed using nanotechnology techniques. Silicon (Si) nanowire arrays are converted into silica nanotube arrays through a thermal oxidation-etching technique. The silica nanotubes retain the arrangement of the original silicon nanowire arrays. These oriented, robust silica nanotube arrays can be useful in nanoscale fluidic bio-separation, sensing, and catalysis, as well as for ESI in mass spectrometry.

Typically silica nanotubes have been synthesized within the pores of porous alumina membrane templates using a sol-gel coating technique. The alumina templates are then dissolved to liberate single silica nanotubes. But once the templates are removed, the silica nanotubes tend to bundle up and become less well oriented. Silica nanotubes, such as these prepared at low temperatures, have porous walls and are relatively fragile.

In an exemplary embodiment, the process to translate silicon nanowire arrays into silica nanotube arrays involves nine major steps as shown in FIGS. 2 and 3. In step 210, a silicon (110) wafer is diced into long slivers (5-10 cm) with rectangular cross-section (120×100 $\mu$m). In other arrangements, silicon wafers with other orientations and other cross section sizes can be used. The slivers are cleaned in acetone and then in isopropanol with ultrasonication for 10 min each. In step 215, the slivers are coated with 10-20 $\mu$m $SiO_2$ using liquid phase chemical vapor deposition (LPCVD) at 450° C. for 10-20 hours followed by annealing at 1000° C. A silicon sliver 300 with $SiO_2$ coating is shown in FIG. 3a. In step 220, the SiO$_2$-coated slivers are dip-coated with a thin layer (300-800 nm) of PMMA (320 in FIG. 3b) by immersion in a 5.5% PMMA/anisol solution and then cured at 150° C. for 1 hour in a convection oven. In step 225, the silicon slivers are mechanically broken into short segments (e.g., approximately 5 cm each). The broken line in FIG. 3b indicates where such a break can occur. The broken end faces are fresh silicon (111) surfaces free of silicon dioxide and PMMA. In other embodiments, silicon surfaces having other orientations can be used. In step 230, 5 nm gold catalyst films are deposited onto a short segment by thermal evaporation or RF sputtering. FIG. 3c shows the broken silicon segment 305 with SiO$_2$ 310, PMMA 320 and gold 330 layers. In step 235, the segment is immersed in dichloromethane for 1 hour, which lifts off the PMMA and the gold films deposited thereon. After rinsing in isopropanol a few times, the segment has gold only on the broken end face. The surfaces of the opposite end and the four longer sides have the silicon dioxide layer 310 from step 215 exposed; the gold and the PMMA 320 have been removed. FIG. 3d shows the silicon segment 305 with the SiO$_2$ layer 310 and the remaining gold film 335.

In step 240, silicon nanowires are grown on the gold-coated end face using SiCl$_4$-based chemical vapor deposition (CVD). Due to homogenous epitaxial growth, the silicon nanowires grow out approximately perpendicular to the end faces and are well-orientated and approximately parallel to the long axis of the segment. FIG. 3e shows the silicon segment 305 with nanowires 340 protruding out from the surface. After nanowire growth, in step 245, the segment is transferred to a thermal oxidation furnace for dry oxygen oxidation at 950° C. for 2 hours to transform the silicon nanowires into silicon/silica core-shell nanowires. In one arrangement, the silica shells have a diameter of about 100 nm. FIG. 3f shows the nanowires with silica shells 350. In step 250, focused ion beam (FIB) milling is used to cut the nanowire ends (e.g., along broken line in FIG. 3f) to ensure that the distal ends or the nanowires are not sealed with either SiO$_2$ or gold and to adjust the nanowire lengths. FIG. 3g shows the silicon segment 305 with the oxidized nanowire array 345. In some arrangements, not all nanowires are cut; the number and density of non-sealed nanowires can therefore be well controlled. The silica end of the silicon segment 305 is also removed, e.g., by cutting. After cutting the nanowire ends, the silicon nanowire cores within the silica shells are exposed. In step 255, the segment is loaded into a XeF$_2$ etching chamber to remove silicon completely from both the nanowire cores and the interior of the silicon base segment. Thus the silicon cores are etched away to form a monolithic structure that contains a silica nanotube array continuously connected to a larger hollow silica base segment—a nanofabricated monolithic multinozzle (NM$^2$) emitter. FIG. 3h shows the NM$^2$ structure 360 that includes a silica base chamber 365 with multiple silica nozzles 370. In optional step 260, at least a portion of the NM$^2$ emitter can be coated with platinum or gold using RF sputtering to ensure good electrical connections for nanoelectrospray.

In step 210, the size of the silicon slivers used in the process can also be chosen to yield (in step 255) segment bases with desirable inner diameters. The height and density of the nanowires can be controlled by varying the CVD time and conditions in step 240. The thickness of the silica shell and the inner diameter of the silica nanotube can be controlled by adjusting the thermal treatment temperature in step 245. In some embodiments, nanowires oxidized at 900° C. have a wall thickness around 55-65 nm, and nanowires oxidized at 800° C. have a wall thickness around 30-35 nm. In one embodiment, step 215, wherein the silicon sliver is coated with SiO$_2$ is eliminated. Later the outer surface of the silicon segment can be oxidized along with the silicon nanowires in step 245.

As discussed above in step 240, silicon nanowires are grown on the end face of the silicon segment. FIG. 4 is a side view scanning electron microscope (SEM) image that shows an end portion 400 of a silicon segment and an array of silicon nanowires 410 extending out from the end portion 400.

As discussed above in step 250, FIB milling can be used to cut nanowire ends and expose silicon cores. FIG. 5a is a schematic drawing that illustrates the method. A silicon segment 500 has silicon nanowires 510 extending from an end face. A silica shell 520 covers both the silicon segment 500 and the nanowires 510. Distal ends of the nanowires 510 are sealed with both silica 520 and gold particles 530. A line 540 indicates where a FIB cut is made. FIG. 5b is a high magnification SEM image of silicon nanowires after cutting with FIB milling. The milling step removes gold and any silica from the nanowire ends, exposing the silicon cores so that the silicon can be etched away to form a silica nanotube array connected directly to the larger hollow silica tube.

The ability to adjust as desired the inner diameter and array density of silica nanotubes can lead to unprecedented low flow rates and therefore extremely high ionization efficiency. In addition, the nanotubes can be made to many desired lengths, (e.g., on the order of 10 μm). A silicon nanotube has such a very high aspect ratio that it can confine an entire biomolecule, which can result in new translocation characteristics. The resulting nanofludics can accommodate even the minute sample size of a single cell with long enough spray times to provide high signal to noise ratios for mass spectrometry signals. Improved ionization efficiency and smaller droplet size can also increase the dynamic range. It may be possible to profile single tumor cells from a biopsy quantitatively followed by laser micro-dissection, or to probe single cells at different cell cycle and/or differentiation stages, thus elucidating the mechanisms underlying stem cell proliferation and differentiation.

The bottom up method can be summarized as growing silicon nanowires onto a clean silicon surface of a silicon base segment. The other surfaces of the base segment are coated with silica. Then the silicon nanowires are oxidized. The silica is removed from the distal ends of the base segment and the silicon nanowires to expose silicon. (The distal ends are the ends farthest away from the center of the structure.) Then silicon is removed from the interior of the structure to form a nanoelectrospray emitter.

Top Down Fabrication

In another embodiment of the invention, microfabricated monolithic multinozzle (M$^3$) emitters are made using micro-electro-mechanical system (MEMS) techniques. Microfluidic channels are etched and enclosed between silicon wafers by a combination of deep reactive ion etching and silicon fusion bonding techniques. These techniques are known to be useful in fabricating a wide variety of micromechanical devices.

In an exemplary embodiment, a novel silicon/silica-based microfabrication process for monolithic fabrication of biocompatible microfabricated monolithic multinozzle (M$^3$) emitters is shown in the schematic cross-section drawings in FIG. 6 and in the flow diagram in FIG. 7. FIG. 6 illustrates the fabrication of only one channel. As the channel is defined by photolithography, it will be clear to a person of ordinary skill in the art that any number of channels, limited only by the photolithographic technique itself, can be fabricated on a single silicon wafer. FIG. 6a shows a silicon wafer 600 with photoresist 610 patterned for photolithography according to step 710. The patterning step determines the length and width of the microfluidic channel. As is well known in the art of photolithography, there is a wide variety of lengths and widths that are possible. In some arrangements, the channel is not straight, but has a curved shape. FIG. 6b shows the wafer 600 after time-multiplexed $SF_6$ etching and $C_4F_8$ passivation cycles have etched a channel or trench 620 according to step 720. FIG. 6c shows a second silicon wafer 630 fusion bonded to the etched silicon wafer 600 to enclose the trench to form a microfluidic channel 625 as described in step 730. In the bonding step 730, the wafers are cleaned first with piranha solution and then are held together via hydrogen bonding between the silanol groups of the wafer surfaces. Subsequent high temperature annealing of the wafers causes the formation of the Si—O—Si covalent bonds at the wafer interface. The bond strength of these wafers has been found to be on the order of the yield strength of single-crystal silicon (~1 GPa). FIG. 6d shows the structure with the ends removed, opening the channel 625, according to step 740. The ends of the structure can be removed using a wafer saw. FIG. 6e shows the structure after it has been oxidized, according to step 750, leaving a layer 640 of $SiO_2$ along the exposed surfaces of the structure. FIG. 6f shows the oxidized structure after one end of the structure has been removed, exposing a fresh silicon surface 650, according to step 760. Finally, in step 770, $XeF_2$ etching removes silicon from the exposed surface 650, leaving a nanoelectrospray nozzle 660 made of $SiO_2$ protruding from the remaining base structure 670, as shown in FIG. 6g.

The process outlined in FIGS. 6 and 7 is straightforward, yet it is flexible enough to be used to fabricate very complicated structures. Structures that have been made using the method described in FIG. 7 are shown in FIG. 8. FIG. 8a is a schematic perspective drawing of a two-nozzle emitter. Region 840 is a $SiO_2$ shell enclosing a base channel 820 and forming two nozzles 860. The box 800 is an unoxidized silicon base. FIGS. 8b and 8e are low magnification SEM images that show one nozzle and a five nozzle linear array, respectively. FIG. 8c is a high magnification image of the single nozzle in FIG. 8b. FIG. 8f is a high magnification image of the five nozzles in FIG. 8e. FIGS. 8d and 8g are high magnification images of a two nozzle array and a ten nozzle linear array, respectively.

Dimensions of the nozzle cross sections, their inter-nozzle spacing, the linear density of the nozzles and the base channel cross section dimensions are shown in Table I for the arrays in FIG. 8.

TABLE I

| Number of nozzles | Nozzle width × depth (μm) | Inter-nozzle spacing (μm) | Base channel width × depth (μm) | Linear density |
|---|---|---|---|---|
| 1 | 10 × 12 | n/a | 100 × 12 | n/a |
| 2 | 10 × 12 | 40 | 100 × 12 | 20/mm |
| 5 | 10 × 12 | 10 | 100 × 12 | 50/mm |
| 10 | 2 × 8 | 8 | 100 × 8 | 100/mm |

A linear density of 100 nozzles/mm, as has been achieved for the ten nozzle linear array, is unprecedented. Numerous nozzles result in lower back pressure and higher sensitivity, the latter of which is due to a much lower flow rate at each single nozzle for a given total flow rate at the base channel.

The top down method can be summarized as etching a trench into the surface of a silicon substrate, sealing a silicon wafer onto the surface of the substrate, thus enclosing the trench to form a channel, cutting the two channel ends, oxidizing structure cutting one end of the structure to expose the silicon core structure, and removing a portion of the silicon core to form a linear electrospray nozzle array.

The microfabricated emitters were tested to see how they perform in nanoelectrospray mass spectrometry. A microfabricated emitter containing a single nozzle (10 μm×8 μm) was compared to a commercially available nanoelectrospray nozzle with an inner diameter of approximately 10 μm (Pt-coated, pulled fused-silica capillary SilicaTips™, New Objective, Inc). Both emitters were tested in a Q-TOF mass spectrometer (Waters, Inc.). The microfabricated emitters were made of conductive silicon; they were used without any additional metal coating.

The overall efficiency in electrospray mass spectrometry is defined as the number of analyte ions recorded at the detector divided by the number of analyte molecules sprayed. It therefore depends on three processes: desolvation, ionization, and transfer into the vacuum system. To make the comparison as meaningful as possible, most of the experimental parameters, such as sample used, parameters for the mass spectrometer, and the input flow rate have been kept identical. However the voltage applied to the devices and the position of the xyz stage that holds the emitter have been optimized for signal intensity. In these experiments, higher voltage (4.5 kV~4.8 kV) was used for the microfabricated emitters than for the commercial tips (2.1 kV~2.4 kV). It may be that depositing metal on the microfabricated emitters or using more conductive silicon may yield similar results with lower voltage. The mass spectrometry platform had been optimized for the commercial tips; more careful optimization of electrical and mechanical connections for the microfabricated emitters may also result in similar performance at a lower voltage.

A standard peptide, [Glu]-Fibrinopeptide B (GFP B, M.W.=1570.57) was used in one test. The GFP B solution (1 μM) was delivered to the emitters at a flow rate of 600 nL/min. FIGS. 9a and 9b show the mass spectra obtained from the microfabricated emitter and the commercial emitter, respectively. The isotopic distributions of doubly-charged ions of GFP B can be seen clearly in both cases with a similar magnitude base peak intensity (BPI) of about 1,000 per scan. Thus the resolution and the sensitivity of the microfabricated emitter (FIG. 9a) compare well to those of state-of-the-art commercial emitters (FIG. 9b).

The microfabricated emitter was also tested in comparison to the commercial emitter for detecting bovine serum albumin (BSA, ~67 kDa), a high molecular weight protein. The mass spectra, accumulated for 10 minutes are shown in FIGS. 10a and 10b for the microfabricated emitter and the commercial emitter, respectively. Charge state distribution and base peak intensity were similar for both emitters. Thirty-eight or more charge states of the protein can be seen with the highest peak at around m/z=1,340, which corresponds to about 50 positive charges.

FIGS. 11a and 11b show that the stability of the microfabricated emitters (relative standard deviation, RSD ~4.5%) is comparable to that of the commercial emitter (RSD ~4.2%).

Performance comparisons were made between one-nozzle (10 μm×12 μm), two-nozzle (10 μm×12 μm), and five-nozzle emitters (8 μm×2 μm), all made by using the same microfabrication process and without additional metal coatings. Myoglobin (~17 kD) analyte was flowed through the base channel at a constant rate of 600 nL/min. On average, the flow rate at the nozzle was about 600 nL/min for the one-nozzle, 120 nL/min for the two-nozzle, and 60 nL/min for the five-nozzle emitter. The nozzles were watched and it was confirmed that electrospray spewed from each of the nozzles. The mass spectra obtained from the emitters are shown in FIGS. 12a, 12b, 12c. The multinozzle emitters (FIGS. 12b, 12c) show slightly higher sensitivity than the one-nozzle emitter (FIG. 12a). Multinozzle emitters are expected to ease back pressure and clogging problems that plague single-nozzle emitters, especially as the channel downsizes to submicron scale.

In another embodiment of the invention, a two dimensional array of $M^3$ emitters contains two rows of linear arrays. The steps for this process are analogous to those for the linear array (FIG. 7) and are outlined in FIG. 13. In step 1310, two silicon substrates are patterned with photoresist to determine the lengths and widths of the microfluidic channels. In step 1320, the substrates are etched to carve out trenches that will become the microfluidic channels. Time-multiplexed $SF_6$ etching and $C_4F_8$ passivation cycles can be used to etch the trenches. In step 1330, the etched substrates are each bonded to an opposite surface of an ultrathin silicon bonding wafer, forming a "sandwich" structure. The single bonding wafer closes the trenches on both etched substrates, forming the microfluidic channels. The ultrathin silicon bonding wafer can be as thin as 200 μm. In some arrangements the bonding wafer is less than 100 μm in thickness. In yet other arrangements, the bonding wafer is between about 30 μm and 50 μm in thickness. The substrates and the bonding wafer can be cleaned first with piranha solution. Then the substrates and the bonding wafer are held together via hydrogen bonding between the silanol groups of the surfaces. Subsequent high temperature annealing of the wafers causes the formation of the Si—O—Si covalent bonds at the interfaces. In step 1340, the ends of the sandwich structure are removed, opening all channels. In step 1350, the structure is oxidized, leaving a layer of $SiO_2$ along the exposed surfaces. In step 1360, one end of the structure is removed, exposing a fresh silicon surface. Finally, in step 1370, $XeF_2$ etching removes silicon from the exposed surface, leaving a two-layer, two-dimensional array of $M^3$ silica emitters made protruding from the remaining base structure.

In another embodiment of the invention, two dimensional arrays of $M^3$ emitters are made by stacking several linear nozzle arrays, such as those shown in FIG. 8. Such a two dimensional array has a geometry reminiscent of the two dimensional arrays produced by the bottom up method described above. The linear arrays in FIG. 8 were made using standard silicon wafers with thicknesses of about 500 μm. Thinner wafers can be used in order to reduce the distance between the linear arrays. In one arrangement, a thin silicon wafer can be used for the lithography steps (steps 710, 720 in FIG. 7), and an even thinner wafer can be used to bond to the etched wafer (step 730 in FIG. 7). For example, when silicon wafers with a thickness of about 100 μm are used to make linear arrays using the process discussed in reference to FIG. 7, the resulting areal nozzle density is $10^3/mm^2$. With thinner bonding wafers even higher densities can be achieved. In comparison, a nozzle array previously fabricated via an out-of-plane approach has an areal density in the range of about 2.5 nozzles/$mm^3$ (Deng, W. W.; Klemic, J. F.; Li, X. H.; Reed, M. A.; Gomez, A. *J. Aerosol Sci.* 2006, 37, 696-714)—two orders of magnitude less than for the wafer arrays made by stacking $M^3$ emitters.

With further optimization and using e-beam lithography or nano-imprint technology, it is also possible to fabricate $M^3$ emitters down to submicron sizes and with densities up to $10^5$ nozzles/$mm^2$ or more.

Using the same process and by changing only the layout, complex built-in structures such as a separation column, a sample reservoir, and a particle filter can be monolithically fabricated along with and in fluid communication with the $M^3$ emitters. In another embodiment, the inorganic nanotube nanofluidic nanotube arrays are integrated with a fully-controlled microfluidics and nanofluidics system. Single cells can be manipulated and digested in separate chambers before being analyzed by femtoelectrospray mass spectrometry.

The silica surfaces of the $NM^2$ or $M^3$ emitters can also be modified. In one embodiment, the silica can be deactivated using a silanization fluid to minimize nonspecific sample adsorption in the inner walls of the emitters.

This invention has been described herein in considerable detail to provide those skilled in the art with information relevant to apply the novel principles and to construct and use such specialized components as are required. However, it is to be understood that the invention can be carried out by different equipment, materials and devices, and that various modifications, both as to the equipment and operating procedures, can be accomplished without departing from the scope of the invention itself.

BRIEF DESCRIPTION OF THE DRAWINGS

FIGS. 3a-3h are a series of schematic cross section drawings that illustrate the steps for fabricating a nanoelectrospray emitter, according to an embodiment of the invention.

FIG. 8a is a schematic drawing that shows a nanoelectrospray emitter with two protruding nozzles.

FIGS. 8b-8g are SEM images of various $M^3$ emitters.

INDUSTRIAL APPLICABILITY

Figure 1:
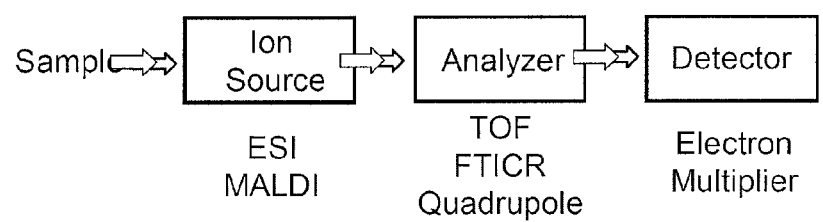
FIG. 1 is a simple diagram outlining the main components of a mass spectrometer.
Figure 2:
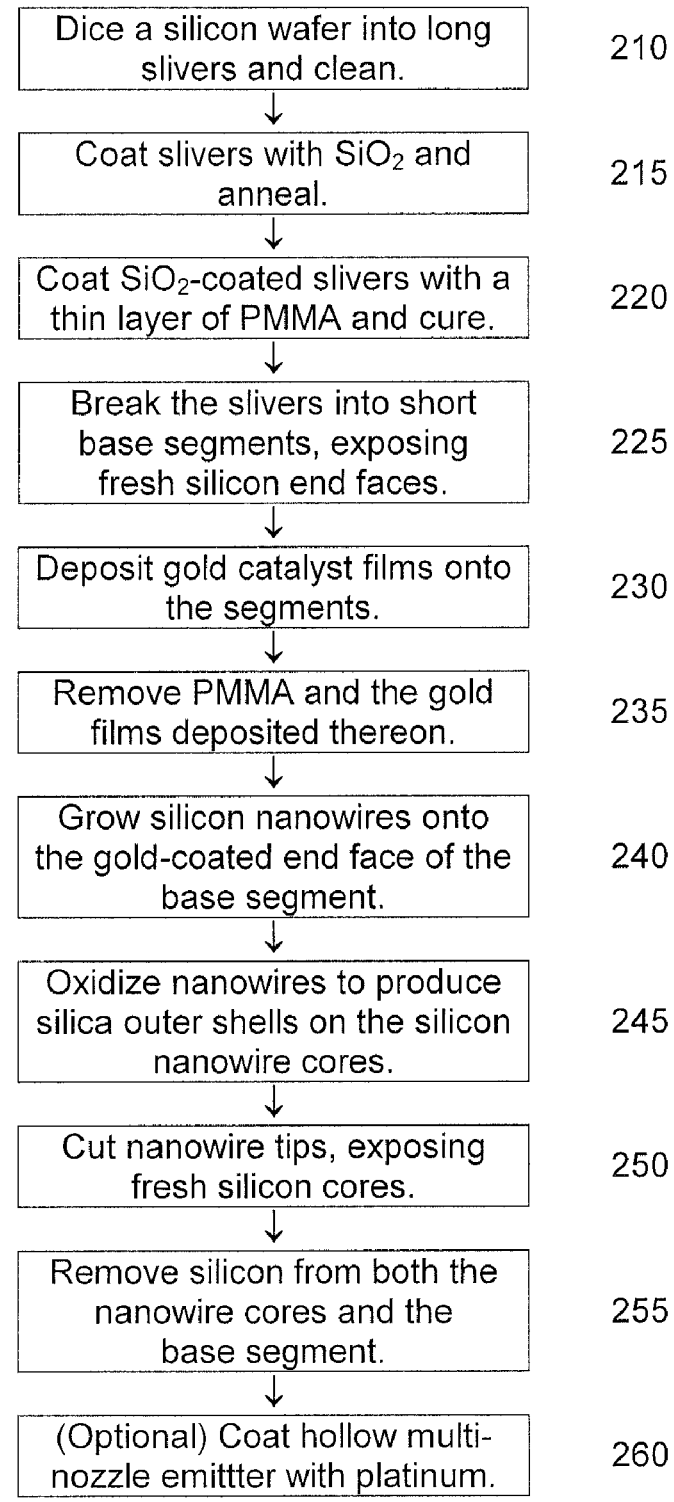
FIG. 2 is a flow chart that shows the steps for fabricating a $NM^2$ emitter, according to an embodiment of the invention.
Figure 4:
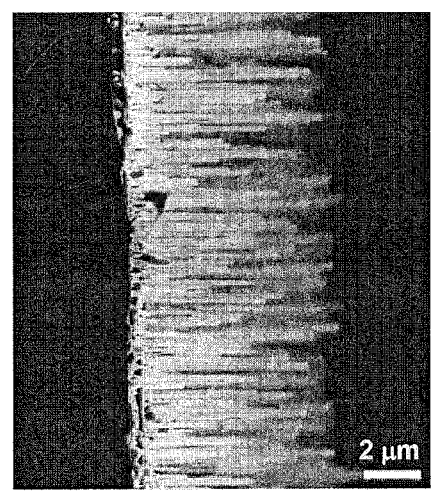
FIG. 4 is a side view SEM image of a silicon nanowire array grown onto the end face of a silicon segment.
Figure 4:
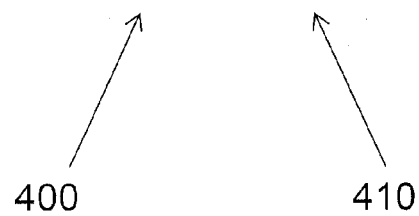
Figure 5A:
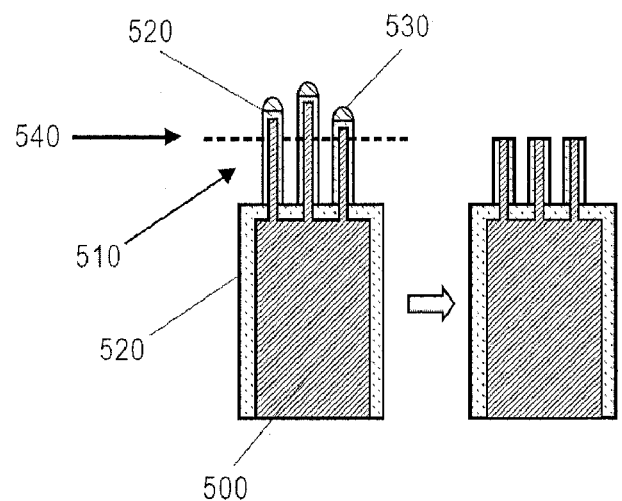
FIG. 5a is schematic cross section drawing that illustrates FIB milling of oxidized silicon nanowires.
Figure 5B:
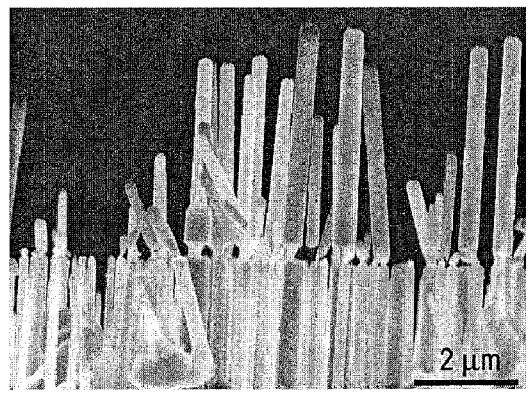
FIG. 5b is a SEM image of oxidized silicon nanowires after FIB milling.
Figure 6A:
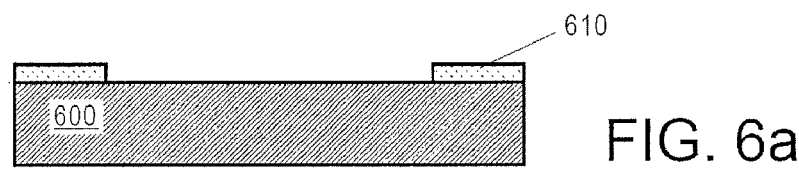
FIGS. 6a-6g are a series of schematic cross section drawings that illustrate the steps for fabricating an $M^3$ emitter, according to an embodiment of the invention.
Figure 6B:
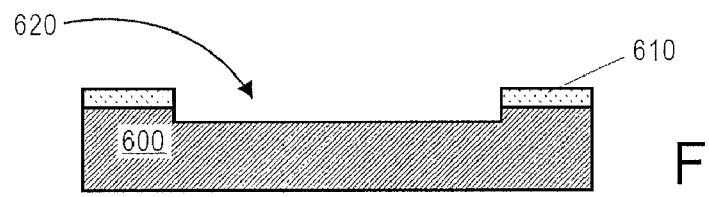
Figure 6C:
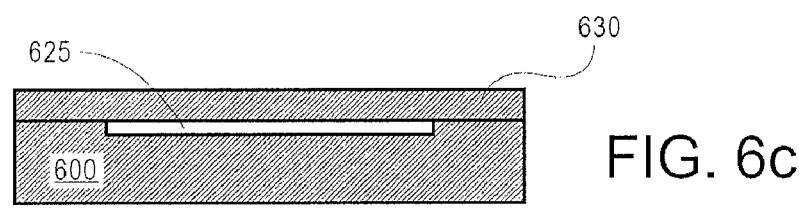
Figure 6D:
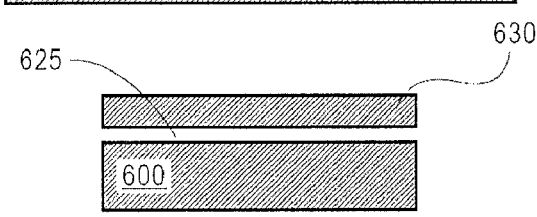
Figure 6E:
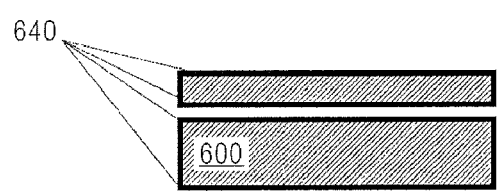
Figure 6F:
Figure 6G:
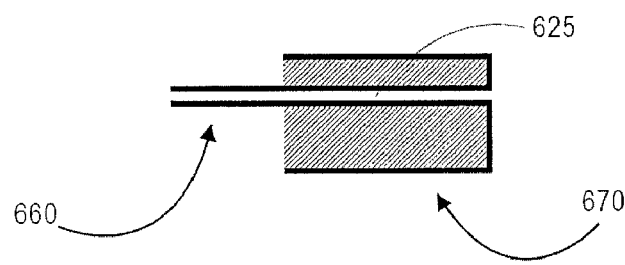
Figure 7:
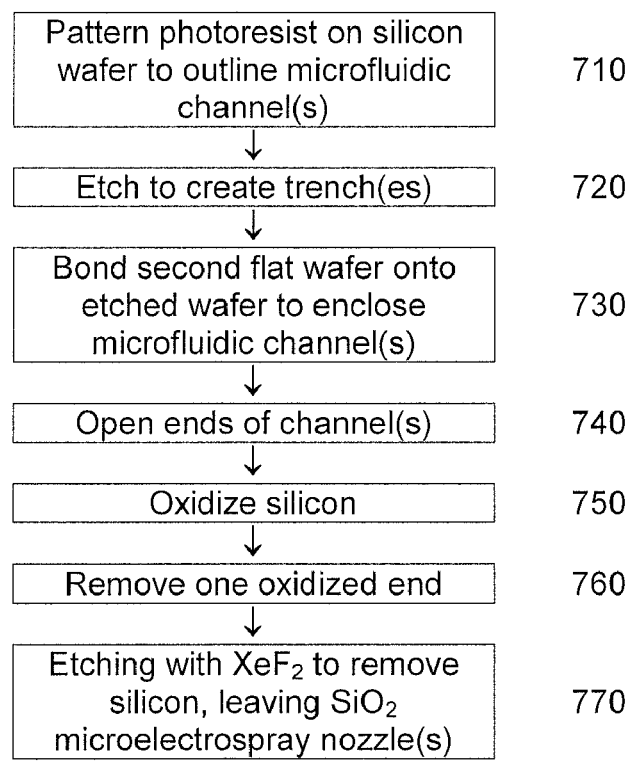
FIG. 7 is a flow chart that shows the steps for fabricating an $M^3$ emitter, according to an embodiment of the invention.
Figures 8E, 8F, 8G:
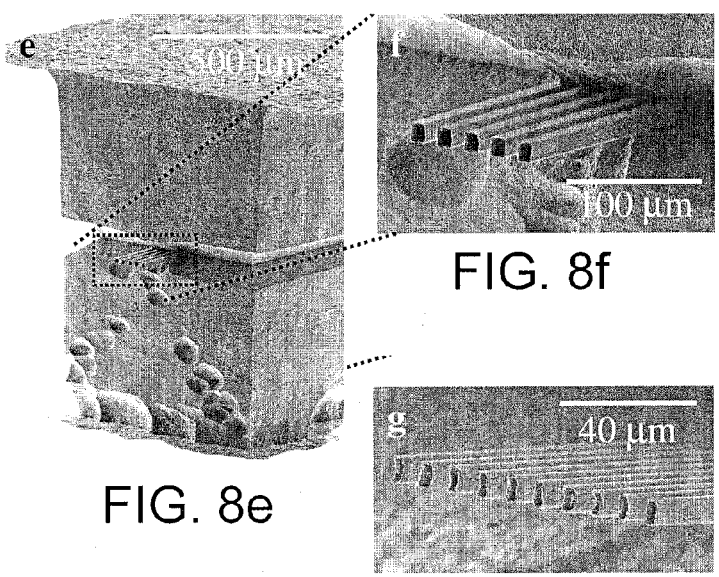
Figure 9:
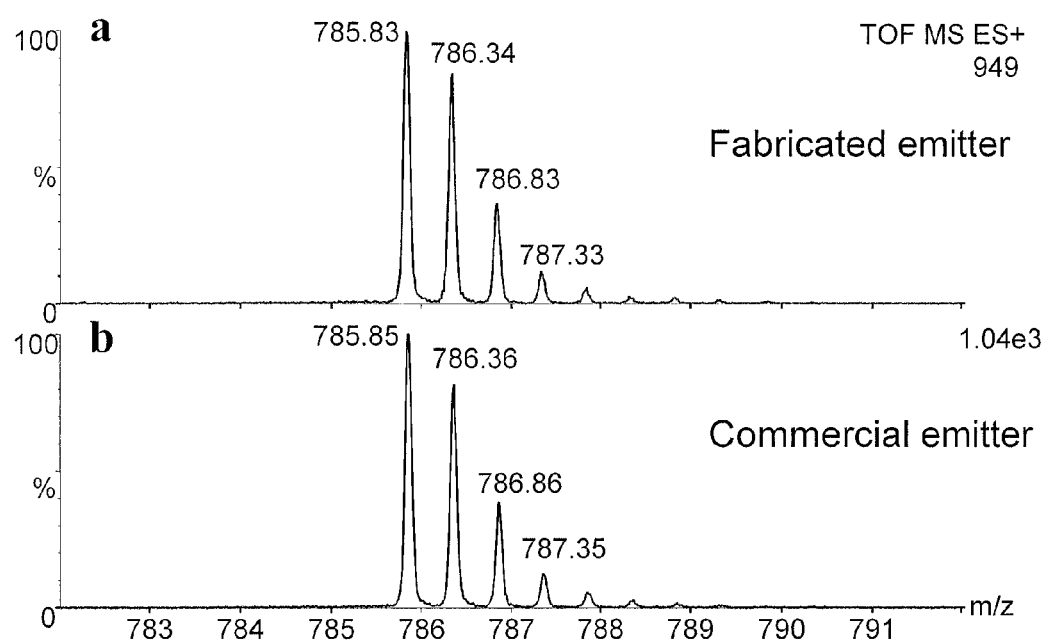
FIGS. 9a and 9b show mass spectra of 1 μM GFP B obtained from a microfabricated single-nozzle emitter and a commercial emitter, respectively.
Figure 10:
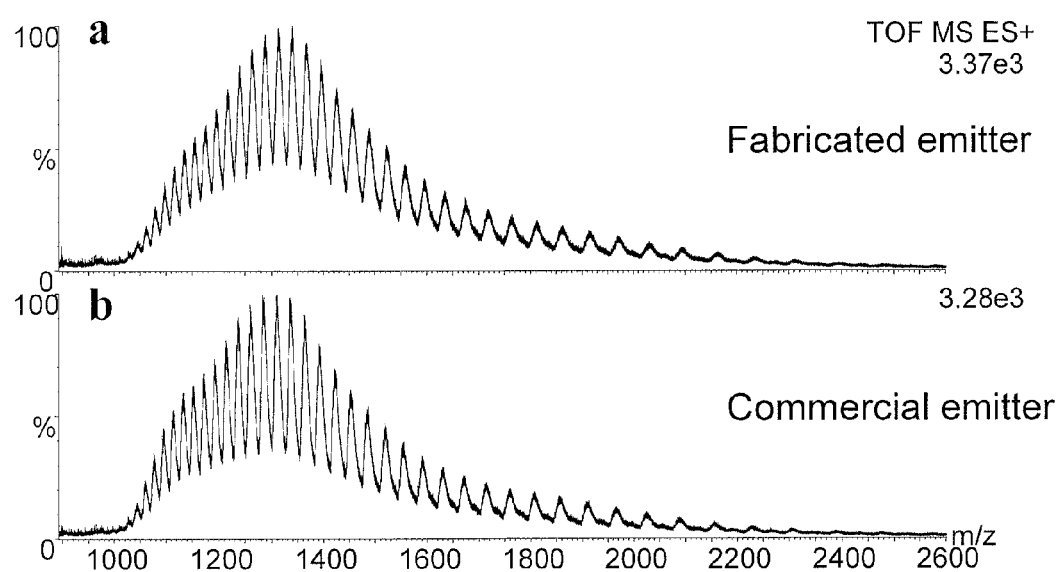
FIGS. 10a and 10b show mass spectra of 1 μM BSA obtained from a microfabricated single-nozzle emitter and a commercial emitter, respectively.
Figure 11:
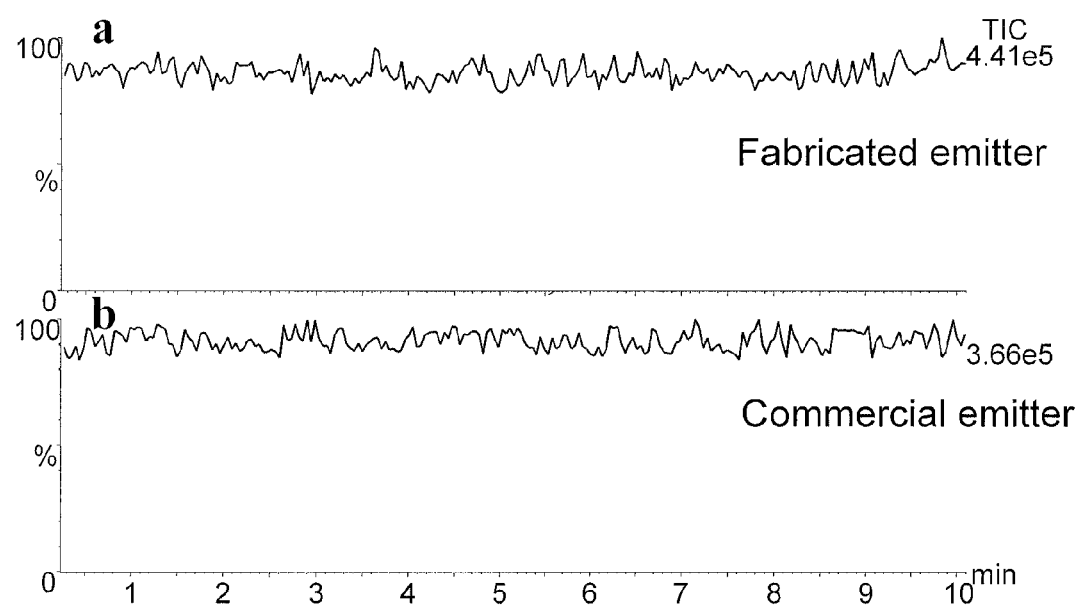
FIGS. 11a and 11b show total ion counts over time for the 1 μM BSA spectra in FIGS. 10a and 10b obtained from a microfabricated single-nozzle emitter and a commercial emitter, respectively.
Figure 12:
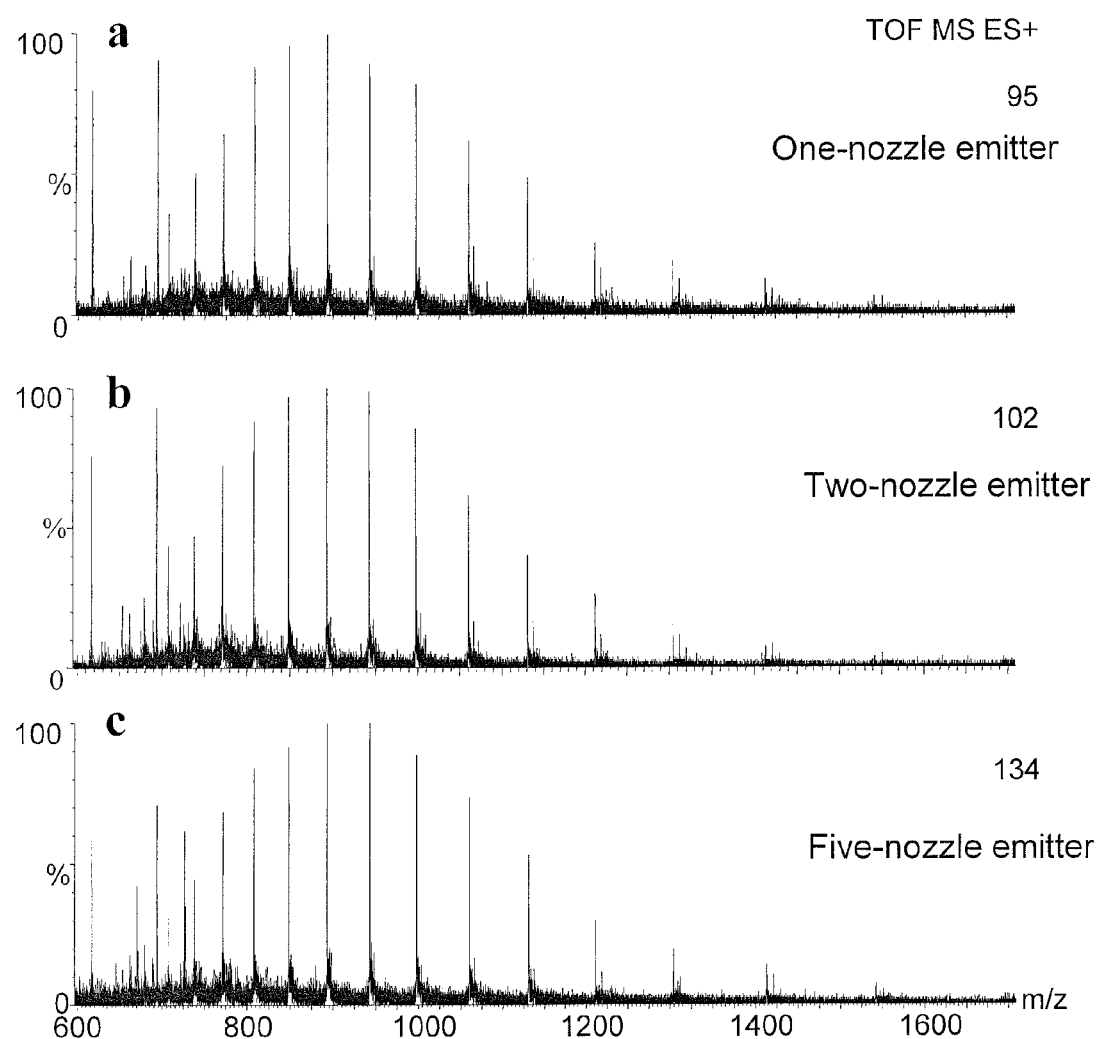
FIGS. 12a, 12b, and 12c show mass spectra of 1 μM myoglobin obtained from a one-nozzle emitter, a two-nozzle emitter, and a five-nozzle emitter, respectively, all microfabricated according to embodiments of the invention.
Figure 13:
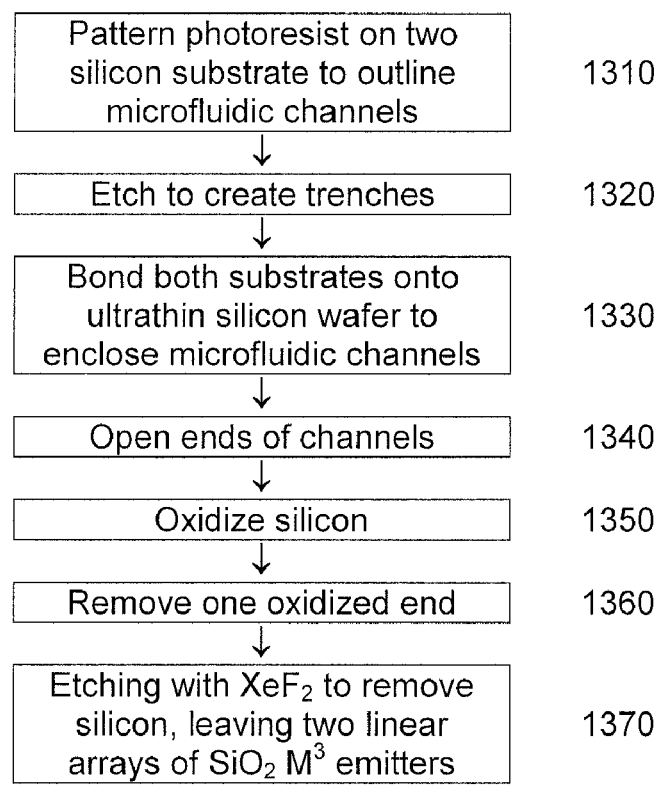
FIG. 13 is a flow chart that shows the steps for fabricating a multi-layer, two dimensional $M^3$ emitter, according to an embodiment of the invention.

The processes described herein for fabricating monolithic multinozzle emitters for nanoelectrospray mass spectrometry are significantly simplified as compared to the current state of the art. The emitters are formed monolithicly, as one piece, thereby avoiding the reliability problems associated with joining very small components. A further distinct advantage of these processes is that they can be scaled up easily for large-scale manufacturing. The emitters can be mass-produced using current microfabrication and nanofabrication technology and can be interfaced readily with microfluidic channels in a lab-on-a-chip proteomics system. Furthermore, microfabricated monolithic multinozzle ($M^3$) emitters and nanofabricated monolithic multinozzle ($NM^2$) emitters have the potential to improve sensitivity for nanoelectrospray mass spectrometry.

The emitter devices described herein have distinct advantages over the current-state-of-the-art. First, a silicon/silica microfluidic channel or base tube has been integrated monolithically with a nanoelectrospray emitter. To date there have been no such monolithic structures available. Such a monolithic structure can pave the way to the large scale integration of nanoelectrospray emitter structures onto lab-on-a-chip devices so that a variety of experiments can be performed easily on the same sample in proteomics and for other applications. Second, this is the first reported electrospray device that has multiple nozzles. $NM^2$ and $M^3$ nanoelectrospray emitters have lower back pressure and yield higher mass spectrometry sensitivity. Furthermore the devices can be fabricated using known nanofabrication and microfabrication processes. As an additional benefit, the emitters described herein provide a means to study systematically the electrospray ionization process, as there is a wide range of sizes and densities of nozzles that can be fabricated for a variety of experiments. When $NM^2$ and $M^3$ emitters are integrated into the ion source of a mass spectrometer, they can provide higher sensitivity in mass spectrometry for proteomic and other applications than has been seen before. With further emitter optimization, additional performance enhancement is expected.

We claim:

1. An electrospray emitter comprising:
   a first silica nozzle extending out from a larger silica base tube;
   wherein the walls of the nozzle and the base tube form a monolithic whole, and
   the first silica nozzle is a nanotube.

2. The emitter of claim 1, further comprising:
   a second silica nozzle extending out from the larger silica base tube;
   wherein the first nozzle, the second nozzle and the base tube form a monolithic whole, and the first silica nozzle and the second silica nozzle form a nanotube array.

3. The emitter of claim 2 wherein each silica nozzle has an interior cross sectional area of no more than 120 square μm.

4. The emitter of claim 2 wherein each silica nozzle has an interior cross sectional area of no more than 16 square μm.

5. The emitter of claim 2 wherein the silica nozzles have a linear density of at least 10 per millimeter.

6. The emitter of claim 5 wherein the silica nozzles have a linear density of at least 100 per millimeter.

7. The emitter of claim 2 wherein the plurality of silica nozzles have an areal density between about $10^4$ and $10^6$ nozzles per square millimeter.

8. The emitter of claim 1, wherein the nanotube has a wall thickness of around 30-65 nm.

9. The emitter of claim 8, wherein the nanotube has a wall thickness of around 30-35 nm.

10. The emitter of claim 8, wherein the nanotube has a wall thickness of around 55-65 nm.

11. The emitter of claim 1, wherein the nanotube has a diameter of less than 2 μm.

12. The emitter of claim 11, wherein the nanotube has a diameter of less than 1 μm.

13. A structure comprising:
    a base tube having a first end and a second end; and
    a plurality of smaller tubules, each tubule having a first end and a second end, the first ends of the tubules seamlessly connected to the second end of the base tube and the tubules extending out from the base tube;
    wherein the structure is monolithic and defines sealed, continuous fluid paths from the first end of the base tube to the second ends of the tubules, and the plurality of smaller tubules form a nanotube array.

14. The structure of claim 13, wherein the second ends of the tubules are between 50 μm and 200 μm from the second end of the base tube.

15. The structure of claim 13, wherein each tubule has a wall thickness of around 30-65 nm.

16. The structure of claim 15, wherein each tubule has a wall thickness of around 30-35 nm.

17. The structure of claim 15, wherein each tubule has a wall thickness of around 55-65 nm.

18. The structure of claim 13, wherein each tubule has a diameter of less than 2 μm.

19. The structure of claim 18, wherein each tubule has a diameter of less than 1 μm.

* * * * *